(12) United States Patent
Merchant et al.

(10) Patent No.: US 11,228,798 B1
(45) Date of Patent: Jan. 18, 2022

(54) CONTENT-MODIFICATION SYSTEM WITH JITTER EFFECT MITIGATION FEATURE

(71) Applicant: Roku, Inc., San Jose, CA (US)

(72) Inventors: Shashank Merchant, Sunnyvale, CA (US); Bruce William Randall, Painswick (GB); Brian Johnson, Eden Priarie, MN (US); Chungwon Seo, Seocho-gu (KR); Seunghyeong Lee, Goyang-si (KR); Paul Jeffrey Holmquist, Andover, MN (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/180,242

(22) Filed: Feb. 19, 2021

Related U.S. Application Data

(60) Provisional application No. 63/046,028, filed on Jun. 30, 2020.

(51) Int. Cl.
*H04N 7/173* (2011.01)
*H04N 21/43* (2011.01)
*G06K 9/62* (2006.01)
*H04N 21/4402* (2011.01)
*H04N 21/8547* (2011.01)
*H04N 21/438* (2011.01)
*G06K 9/00* (2006.01)

(52) U.S. Cl.
CPC ..... *H04N 21/4302* (2013.01); *G06K 9/00744* (2013.01); *G06K 9/6201* (2013.01); *H04N 21/4383* (2013.01); *H04N 21/440281* (2013.01); *H04N 21/8547* (2013.01)

(58) Field of Classification Search
CPC .......... H04N 21/4302; H04N 21/4383; H04N 21/440281; H04N 21/8547; G06K 9/00744; G06K 9/6201
See application file for complete search history.

(56) References Cited

U.S. PATENT DOCUMENTS

2013/0054645 A1\* 2/2013 Bhagavathy .......... G06F 16/783
707/780
2014/0161263 A1\* 6/2014 Koishida ............... G06F 16/683
381/56

(Continued)

*Primary Examiner* — Mulugeta Mengesha
(74) *Attorney, Agent, or Firm* — McDonnell Boehnen Hulbert & Berghoff LLP

(57) ABSTRACT

One high-level aspect of a content-modification system and related methods may involve facilitating content modification by a content-presentation device of received broadcast content in a controlled manner, while under circumstances in which some events that can impact timing may be unpredictable. In particular, certain operations by a content-presentation device may involve matching received content with specific expected content as determined by one or another component of the content-modification system, in order to confirm proper conditions are met for the content-presentation device to proceed with, or continue, content-modification operations. It can happen the matching procedure becomes subject or susceptible to timing irregularities, or jitter. In some instances, jitter may impact the ability to derive the benefits of content modification. Accordingly, example embodiments herein are directed to systems and method for compensation and/or mitigating the effects of jitter.

20 Claims, 15 Drawing Sheets

(56) References Cited

U.S. PATENT DOCUMENTS

2017/0094347 A1* 3/2017 Maughan ............ H04N 21/4532
2018/0302670 A1* 10/2018 Lee ..................... H04N 21/435
2020/0119824 A1* 4/2020 Anniballi ............... H04H 60/37

* cited by examiner

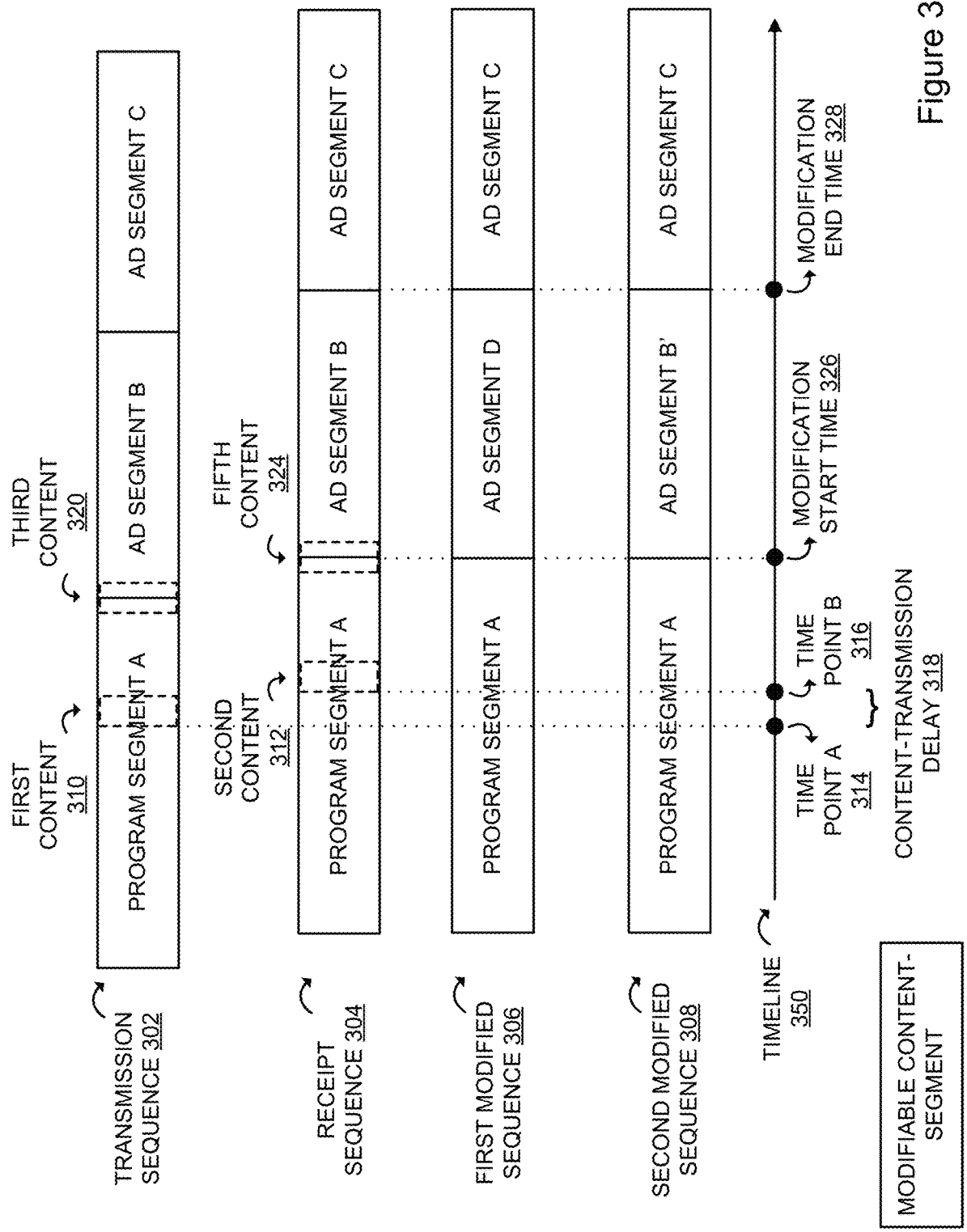

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | | |
|---|---|---|---|---|---|---|
| T9 | Compare first fingerprint data and second fingerprint data | | | | | |
| T10 | Detect a match between first fingerprint data and second fingerprint data | | | | | |
| T11 | Identify the channel on which the second content is being received | | | | | |
| T12 | Generate metadata associated with the identified channel | | | | | |
| T13 | Transmit an indication of the identified channel and the associated metadata | | | | | |
| T14 | | | | | | Receive the indication of the identified channel and the associated metadata |

Figure 4B

| | | | | | | | | | |
|---|---|---|---|---|---|---|---|---|---|
| T15 | | | | | | | | | |
| T16 | Transmit third content | | | | | | | | |
| T17 | Generate third fingerprint data and third metadata | | | | | | | | |
| T18 | Transmit third fingerprint data and third metadata | | | | | | | | |
| T19 | | | | | Receive modifiable content segment | | | | |
| T20 | | | Determine historical content consumption data | | Generate fourth fingerprint data and fourth metadata | | | | |
| T21 | | | | | Transmit fourth fingerprint data and fourth metadata | | | | |
| T22 | | | | Receive third fingerprint data and third metadata | | | | | |
| T23 | | | | Receive fourth fingerprint data and fourth metadata | | | | | |

Figure 4C

| | | | | | | |
|---|---|---|---|---|---|---|
| T24 | | | | | | |
| T25 | Compare at least a portion of third fingerprint data and at least a portion of fourth fingerprint data | | | | | |
| T26 | Detect a match between at least a portion of third fingerprint data and at least a portion of fourth fingerprint data | | | | | |
| T27 | Identify an upcoming content modification opportunity on the identified channel | | | | | |
| T28 | Transmit the third fingerprint data and the third metadata | Receive third fingerprint data and third metadata | | | | |
| T29 | | Receive fifth content | | | | |
| T30 | | Output for presentation fifth content | | | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | Receive request and select supplemental content | | | | | |
| T37 | | Transmit request for link | | | | | |
| T38 | | | | | | | Transmit link |

Figure 4E

|  |  |  |  | Transmit link |  |  |
|---|---|---|---|---|---|---|
| T39 | | | | | | |
| T40 | Receive link and retrieve supplemental content | | | | | |
| T41 | Perform content modification operation | | | | | |

Figure 4F

CONTENT-MODIFICATION SYSTEM WITH JITTER EFFECT MITIGATION FEATURE

CROSS-REFERENCE TO RELATED APPLICATIONS

This application claims priority under 35 U.S.C. § 119(e) to U.S. Provisional Patent Application Ser. No. 63/046,028, filed on Jun. 30, 2020, which is incorporated herein in its entirety by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method carried out by a content-presentation device of a content-modification system that includes a content-distribution system may include: making a first determination of an upcoming content-modification opportunity in content data received by the content-presentation device on an identified channel from the content-distribution system, wherein identification of the channel is based on a match between first reference fingerprint data representing a first transmitted portion of the content data transmitted by the content-distribution system and first query fingerprint data representing at least a portion of the received content data, wherein the received content data comprises a sequence of content frames received at a source frame rate, and wherein the first query fingerprint data are generated by the content-presentation device from a first subset of content frames by sampling a first received portion of the received sequence of content frames at a first sampling rate that is less than the source frame rate; receiving second reference fingerprint data representing a second transmitted portion of the content data transmitted by the content-distribution system, the second reference fingerprint data comprising a sequence of reference fingerprints received at the source frame rate, wherein the second transmitted portion follows the first transmitted portion; in response to making the first determination, switching from the first sampling rate to a second, higher sampling rate, wherein the second sampling rate is no greater than the source frame rate; obtaining a second subset of content frames by sampling a second received portion of the received sequence of content frames at the second sampling rate, wherein the second received portion follows the first received portion; obtaining a set of timestamps, each being respectively associated with a respective one of the content frames of the second subset; generating second query fingerprint data from the second subset of content frames, the second query fingerprint data comprising a sequence of second query fingerprints, each respectively derived from a respective one of the second subset of content frames and having the same associated respective timestamp; using the timestamps associated with the second query fingerprints to align the second query fingerprint data with the second reference fingerprint data, and to thereby compensate for timing jitter in the sequence of second query fingerprints caused by frame jitter in the second subset of content frames; and determining whether or not the aligned second query fingerprint data matches the second reference fingerprint data to at least a matching threshold.

In another aspect, a content-presentation device may include: one or more processors; and a non-transitory computer-readable storage medium, having stored thereon program instructions that, upon execution by the one or more processors, cause the content-presentation device to carry out operations including: making a first determination of an upcoming content-modification opportunity in content data received by the content-presentation device on an identified channel from the content-distribution system, wherein identification of the channel is based on a match between first reference fingerprint data representing a first transmitted portion of the content data transmitted by the content-distribution system and first query fingerprint data representing at least a portion of the received content data, wherein the received content data comprises a sequence of content frames received at a source frame rate, and wherein the first query fingerprint data are generated by the content-presentation device from a first subset of content frames by sampling a first received portion of the received sequence of content frames at a first sampling rate that is less than the source frame rate; receiving second reference fingerprint data representing a second transmitted portion of the content data transmitted by the content-distribution system, the second reference fingerprint data comprising a sequence of reference fingerprints received at the source frame rate, wherein the second transmitted portion follows the first transmitted portion; in response to making the first determination, switching from the first sampling rate to a second, higher sampling rate, wherein the second sampling rate is no greater than the source frame rate; obtaining a second subset of content frames by sampling a second received portion of the received sequence of content frames at the second sampling rate, wherein the second received portion follows the first received portion; obtaining a set of timestamps, each being respectively associated with a respective one of the content frames of the second subset; generating second query fingerprint data from the second subset of content frames, the second query fingerprint data comprising a sequence of second query fingerprints, each respectively derived from a respective one of the second subset of content frames and having the same associated respective timestamp; using the timestamps associated with the second query fingerprints to align the second query fingerprint data with the second reference fingerprint data, and to thereby compensate for timing jitter in the sequence of second query fingerprints caused by frame jitter in the second subset of content frames; and determining whether or not the aligned second query fingerprint data matches the second reference fingerprint data to at least a matching threshold.

In another aspect, a non-transitory computer-readable storage medium, may have stored thereon program instructions that, upon execution by one or more processors of a content-presentation device, cause the content-presentation device to carry out operations including: making a first determination of an upcoming content-modification opportunity in content data received by the content-presentation device on an identified channel from the content-distribution system, wherein identification of the channel is based on a match between first reference fingerprint data representing a first transmitted portion of the content data transmitted by the content-distribution system and first query fingerprint data representing at least a portion of the received content data, wherein the received content data comprises a sequence of content frames received at a source frame rate, and wherein the first query fingerprint data are generated by the content-presentation device from a first subset of content frames by sampling a first received portion of the received sequence of content frames at a first sampling rate that is less than the source frame rate; receiving second reference fingerprint data representing a second transmitted portion of the content data transmitted by the content-distribution system, the second reference fingerprint data comprising a sequence of reference fingerprints received at the source frame rate, wherein the second transmitted portion follows the first transmitted portion; in response to making the first determination, switching from the first sampling rate to a second, higher sampling rate, wherein the second sampling rate is no greater than the source frame rate; obtaining a second subset of content frames by sampling a second received portion of the received sequence of content frames at the second sampling rate, wherein the second received portion follows the first received portion; obtaining a set of timestamps, each being respectively associated with a respective one of the content frames of the second subset; generating second query fingerprint data from the second subset of content frames, the second query fingerprint data comprising a sequence of second query fingerprints, each respectively derived from a respective one of the second subset of content frames and having the same associated respective timestamp; using the timestamps associated with the second query fingerprints to align the second query fingerprint data with the second reference fingerprint data, and to thereby compensate for timing jitter in the sequence of second query fingerprints caused by frame jitter in the second subset of content frames; and determining whether or not the aligned second query fingerprint data matches the second reference fingerprint data to at least a matching threshold.

BRIEF DESCRIPTION OF THE DRAWINGS

FIG. 3 is a diagram of example linear sequences of content and related concepts.

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
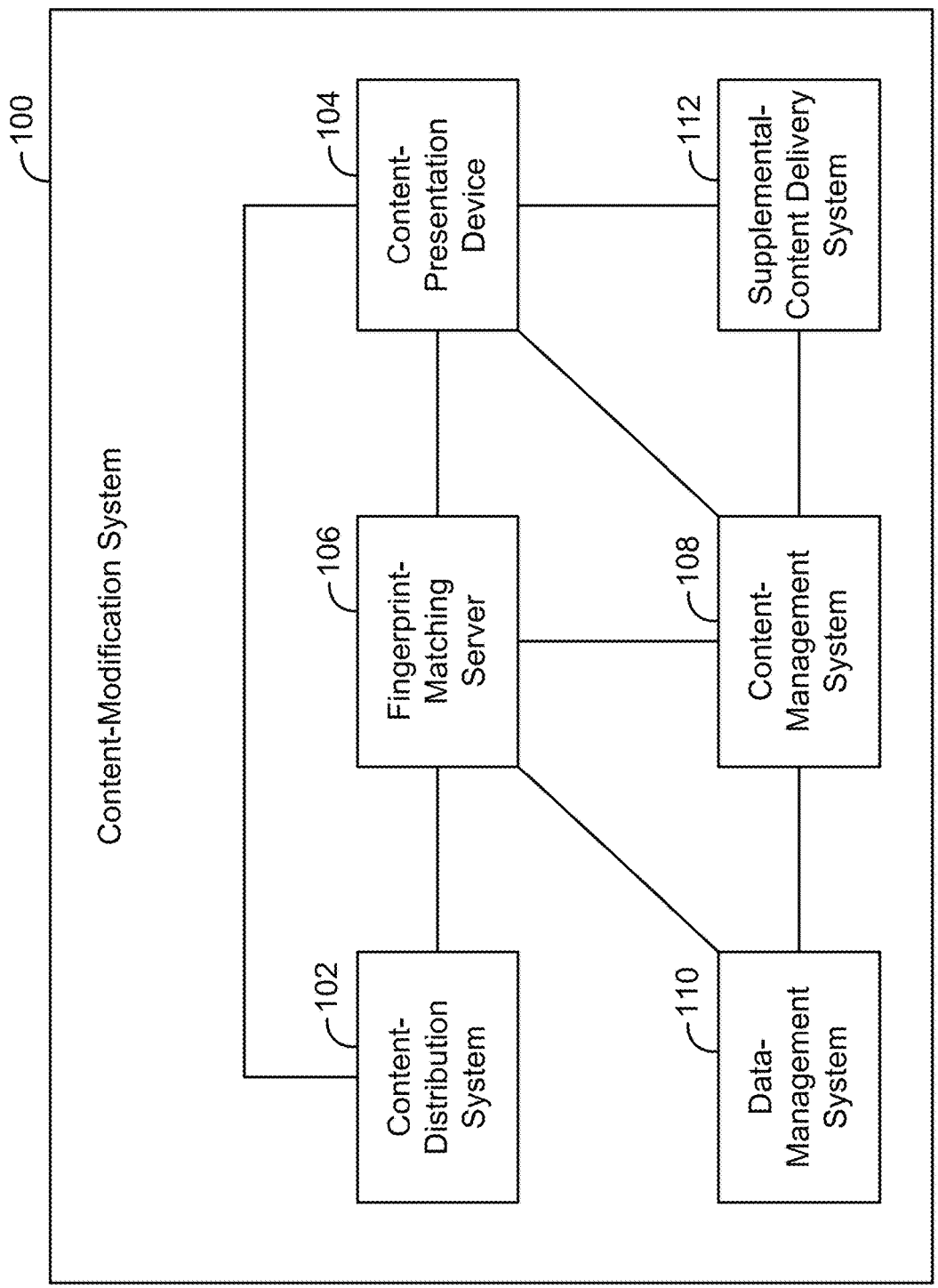
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

One high-level aspect of a content-modification system and related methods may involve facilitating content modification by a content-presentation device of received broadcast content in a controlled manner, while under circumstances in which some events that can impact timing may be unpredictable. In particular, certain operations by a content-presentation device may involve matching received content with specific expected content as determined by one or another component of the content-modification system, in order to confirm proper conditions are met for the content-presentation device to proceed with, or continue, content-modification operations. It can happen the matching procedure becomes subject or susceptible to timing irregularities, referred to herein as "jitter." In some instances, jitter may impact the ability to derive the benefits of content modification. Accordingly, example embodiments herein are directed to systems and method for compensation and/or mitigating the effects of jitter.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
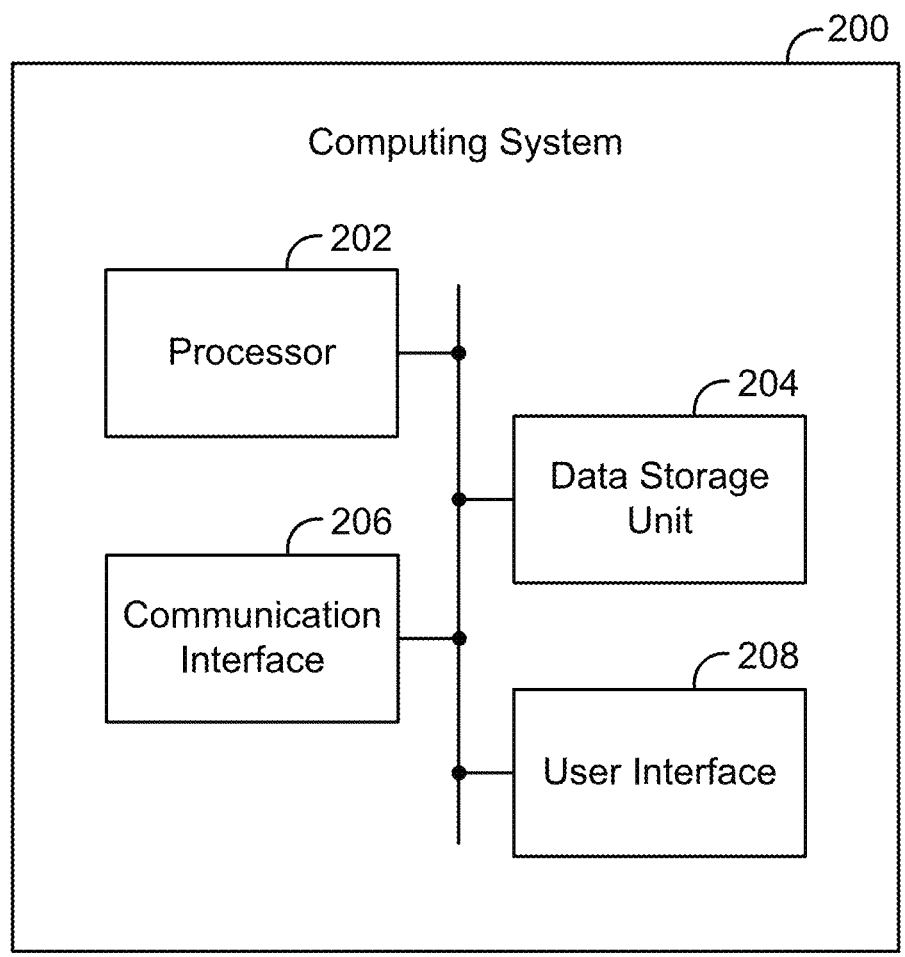
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof.

In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata from the content-distribution server system 102, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Mitigation of Jitter-Related Degradation of Fingerprint Matching

Example embodiments described above in terms of illustrative operations address a basic challenge, among others, of facilitating modification by a content-presentation device of received broadcast content in a controlled manner, while under circumstances in which some events that can impact timing may be unpredictable. Consideration of a high-level use case can provide a simplified summary of some of the basic aspects of the overall procedure described above and help illustrate an example of the basic challenge. For purposes of illustration and by way of example, in the following use case, the content-presentation device is taken to be a "smart TV"—namely, one that may incorporate computational resources and programming capabilities for implementing and carrying out operations described herein. Also for purposes of illustration and by way of example, content from the content-distribution system is taken to be broadcast program content, the modifiable content is taken to be an advertising segment in the broadcast content stream, the replacement content is taken to be a replacement advertising segment, and the modification operation is taken to be a content-replacement operation. It should be understood that these aspects of the use case are illustrative examples, and not intended to be limiting with respect to example embodiments described herein.

The example use case and related operations may be summarized as follows. The content-modification system, including example components described above (e.g., in connection with FIG. 1), first identifies what channel a particular smart TV is tuned to in order to be able to determine that an upcoming advertising segment in the broadcast stream on the identified channel represents a "replaceable ad segment"—i.e., a replacement opportunity. Then, knowing an identity of the particular smart TV, the content-modification system can identify a particular replacement advertising segment (e.g., one that is customized to the particular smart TV or its user). The identified replacement advertising segment may be hosted on an external content server or device separate from the content-distribution system. In order to replace the replaceable ad segment with the identified replacement advertising segment, the smart TV needs to be alerted to the replacement opportunity and directed to a location where the identified replacement advertising segment can be downloaded or retrieved. Then, the smart TV needs to be able to determine both a precise instant at which to start presenting the replacement advertising segment instead of the replaceable ad segment, and ensure that it is still receiving the broadcast stream in which the replaceable ad segment is upcoming. That is, the smart TV needs to be able to determine that it is still tuned to the same channel on which the replaceable ad segment was identified. These last two aspects encompass an example of the basic challenge.

As a simple explanation, if a user changes the channel after the identification of the replaceable ad segment and the determination of the replacement advertising segment, the identification of the replaceable ad segment and the determination of the replacement advertising segment may no longer be valid. Since such a channel-change operation will typically not be predictable, the content-modification system needs a way to keep the smart TV informed of both a confirmation that the smart TV is actually receiving the broadcast stream with the upcoming replaceable ad segment, and the precise timing for the replacement operation. In example embodiments, the initial channel identification may be accomplished in operations described above involving the cold match procedure, and the basic challenge is addressed in operations described above involving the hot match procedure.

Referring again to FIGS. 4A-4F, the cold match operation described in connection with time-period T10 entails comparing reference fingerprints representing content as transmitted by the content-distribution system on a particular channel with query fingerprints representing content as received by the smart TV. The cold match operation is performed by the fingerprint-matching server. If there is match—i.e., a cold match—the fingerprint-matching server can determine that the smart TV is tuned to the particular channel. Thus, the cold match operation is based on reference fingerprints from the content-distribution system and query fingerprints from the smart TV (more generally, the content-presentation device).

The hot match operation, described in connection with time-period T33, also entails comparing reference fingerprints representing content as transmitted by the content-distribution system, again on the particular channel, but temporally closer to a replaceable ad segment. The query fingerprints used in a hot match again represent content as received by the smart TV, but temporally closer to a time instant at which replacement should begin if the smart TV is still tuned to the same particular channel. The hot match operation is performed by the smart TV (more generally, the content-presentation device). If there is match—i.e., a hot match—the smart TV can determine that it still tuned to the particular channel, and can derive precise timing information for determining the time instant at which to begin the replacement operation. The smart TV also uses a successful hot match to facilitate obtaining the replacement advertising segment, as described, for example in connection with time-periods T22-T26 and T35-T40.

As described above, broadcast content may include or be frame-based content, such as one or more sequences of video frames. As such, each fingerprint, generated by the content-distribution system and/or the smart TV may be some form of metric representation of the content data in a given frame. For example, each fingerprint may be a metric representation of a given video frame. The metric representation may be such that in a sequence of fingerprints generated from a corresponding sequence of video frame, for example, each fingerprint is sufficiently distinct to serve as an identifier of a distinct frame of the video sequence. Thus, for the example of broadcast video content, the cold and hot matching operations facilitate matching of a sequence of video frames transmitted by the content-distribution system to a sequence video frames received by the smart TV, based on matching sequences of fingerprints respectively corresponding to the transmitted and received video-frame sequences.

Broadcast video content may be received by the smart TV at a source frame rate, which may be relatively high. For example, a source frame rate may be approximately 30 frames per second (e.g., a standard rate in North America is 29.97 frames per second). In practice, the smart TV may down-sample received video frames to a lower rate before generating fingerprints used for the cold and/or hot matching. For example, the smart TV may use a simple frame-skipping scheme in which it samples every $16^{th}$ frame to create a down-sampled frame sequence of two frames per every approximately one second, and thus generates a sequence of two fingerprints per every approximately one second, each fingerprint corresponding to every $16^{th}$ frame. As another example, the smart TV may sample every $4^{th}$ frame to create a down-sample frame sequence of eight frames per every approximately one second, and thus generate a sequence of eight fingerprints per every approximately one second, each fingerprint corresponding to every $4^{th}$ frame. Note that the simple frame-skipping scheme described the down-sampled frame rates are measured in units of "every approximately one second" because the example down-sampling ratios—30/16 and 30/4—are not exact integers. Other source frame rates and down-sampling ratios are possible as well. Other down-sample schemes may be used as well, such as closest match, frame "blending" or interpolating, and/or motion compensated.

The degree of down-sampling may vary depending on whether the smart TV is generating query fingerprints for a cold match process or a hot match process. For example, the cold match process, which may typically be carried out by the fingerprint-matching server using query fingerprints transmitted from the smart TV, may not necessarily require a high query fingerprint rate since a cold match is used to make an initial identification of the channel that the smart TV is tuned to, prior to determining that a replacement opportunity is upcoming or even exists. The hot match process is carried out by the smart TV, and because it is used both to confirm that the initial channel identity is still valid in the face of a channel change, for example, and to determine precise timing information for the replacement operation, the timing resolution may need to be higher than that of the cold match. Thus, the hot match process may entail switching from a lower to a higher sampling rate when down-sampling video frames arriving at the source rate.

The smart TV may switch from a lower sampling rate to a higher sampling rate upon making a first determination that a replacement opportunity is upcoming. The first determination could be triggered, for example, by the smart TV beginning to receive reference fingerprints from the fingerprint-matching server. This could be an indication that the fingerprint-matching server has determined that a replacement opportunity exists and is upcoming (e.g., as described in connection with time-periods T25-T27). Thus, the smart TV may begin operating in a mode in which it carries out the hot match procedure. And this mode may thus include sampling the incoming video broadcast stream from the content-distribution device at a higher sampling rate in order to generate corresponding query fingerprints at the higher sampling rate. The smart TV may then attempt to hot match the locally-generated query fingerprints with reference fingerprints received from the fingerprint-matching server.

Similarly, while the smart TV is performing a content-replacement operation following a successful hot match prior to and up through the start of the replacement operation, the smart TV may continue to operate in a mode in which it continuously (or nearly so) carries out the hot match procedure. This is to help ensure that the replacement operation continues as long as the initial channel identification remains valid (i.e., as validated by the continuous hot match procedure), and that the replacement operation is aborted if the initial channel identification becomes invalid during the operation (i.e., as invalidated by the continuous hot match procedure). More simply, carrying out the hot match procedure during the replacement operation acts as a sort of real-time monitoring of a channel change, which, if it occurs, would alert the smart TV to abort the replacement operation and switch to whatever content is now being received on the new channel.

Figure 5A:
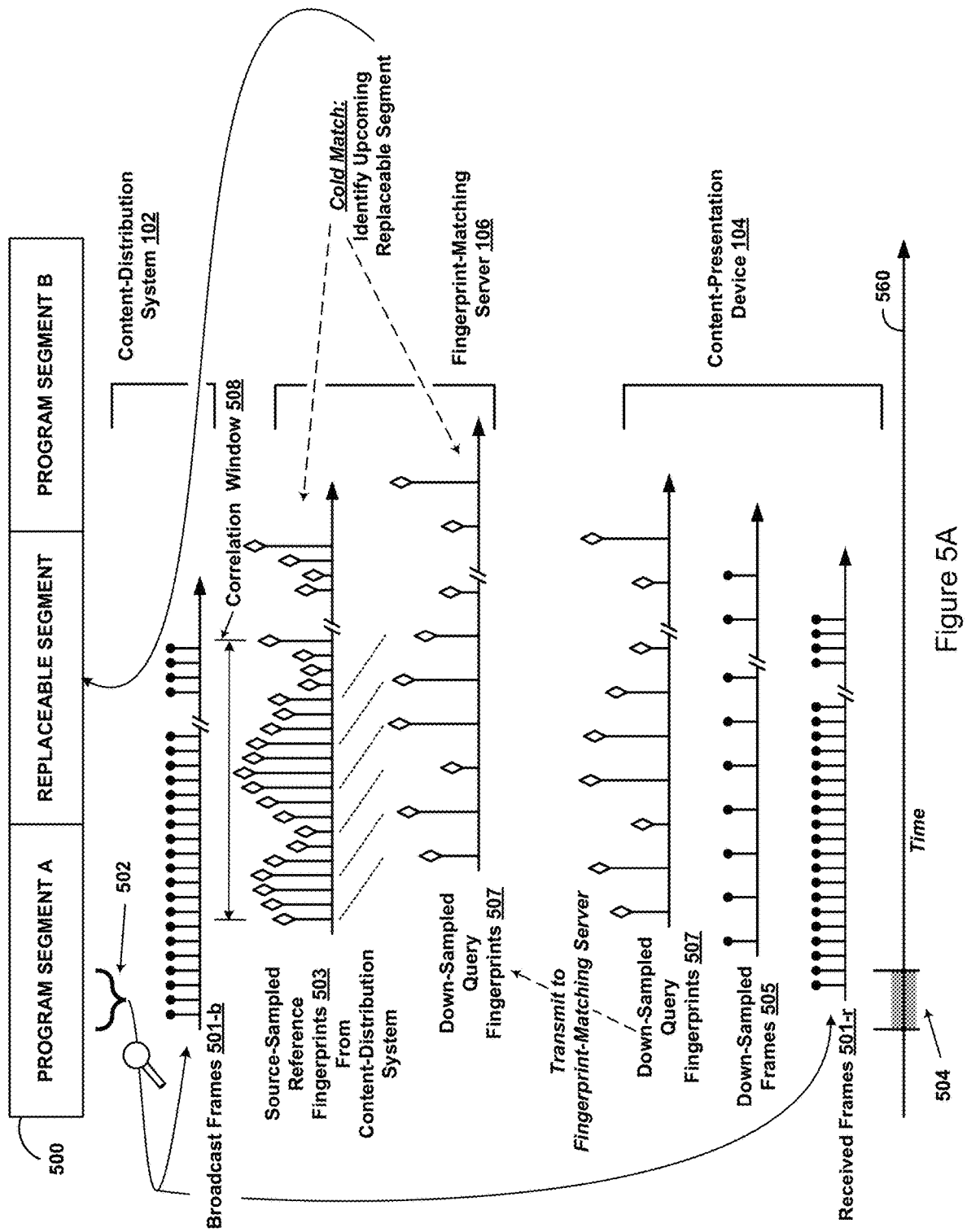
FIGS. 5A and 5B collectively illustrate example operation of certain aspects of content modification.
Figure 5B:
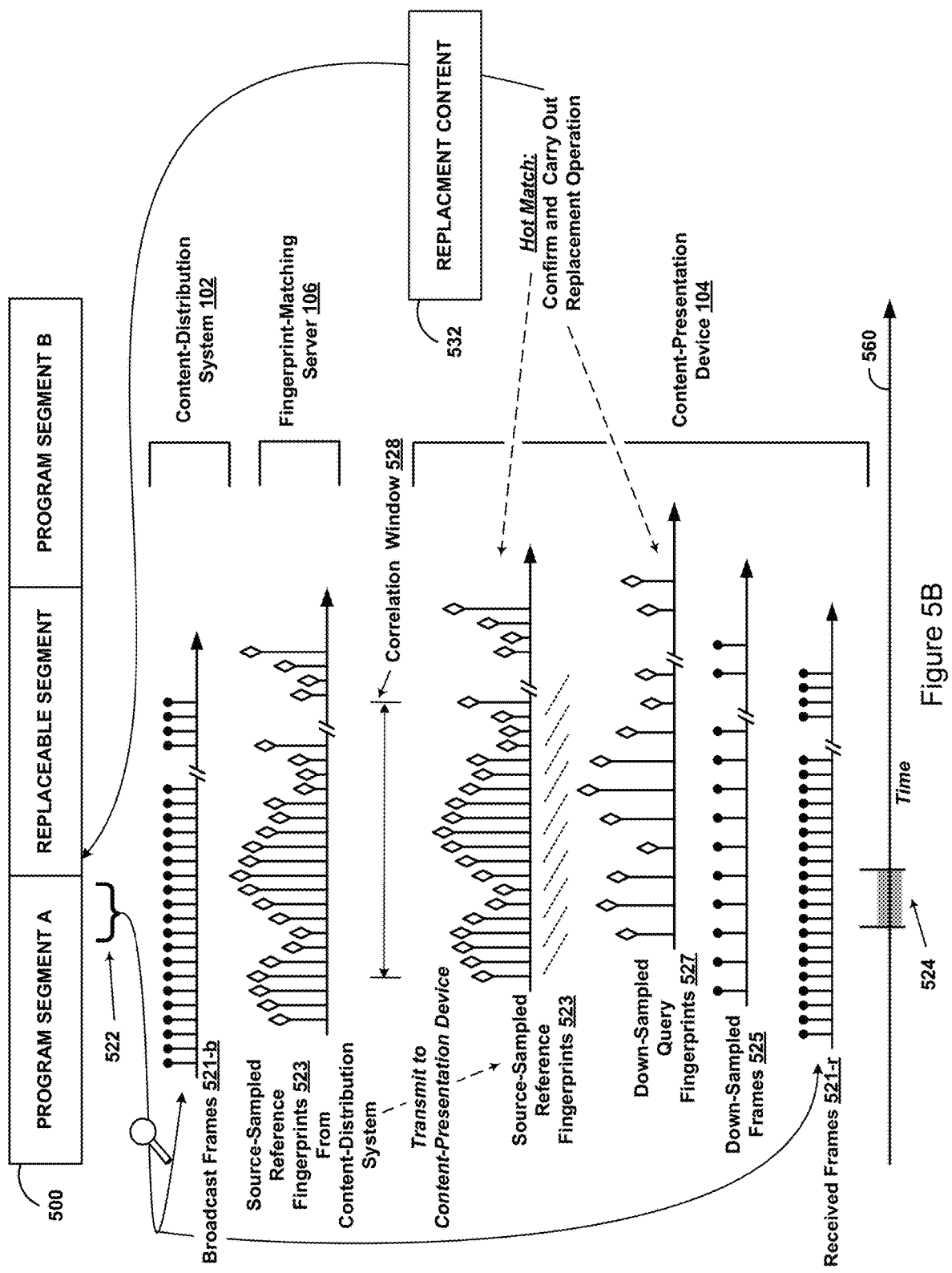

FIGS. 5A and 5B illustrate two different examples of frame down-sampling and fingerprint matching during two time snapshots corresponding respectively to the cold match operation and the hot match operation, in accordance with example embodiments. By way of example and without loss of generality, content modification is taken to be content replacement. However, the example operations described below apply to other forms of content modification as well, such as content overlay, also described above. In both figures, a sequence 500 of three consecutive and contiguous broadcast segments are shown, representing program content segments as broadcast by a content-distribution system, such as the one in FIG. 1, for example. Evidently, and by way of example, the sequence 500, as broadcast, includes a program segment A, followed by a replaceable segment (more generally, modifiable content), which is then followed by a program segment B. In accordance with the description above, operations may be performed to recognize the replaceable segment, identify and obtain by the smart TV replacement content, carry out, by the smart TV, replacement of the replaceable content, and switch back to program segment B when the replacement content completes. A timeline 560, with time increasing to the right, is displayed at the bottom of each of FIGS. 5A and 5B.

In each of FIGS. 5A and 5B, particular operations carried out by the content-distribution system 102, the fingerprint-matching server 106, and the content-presentation device 104 are depicted conceptually. Three brackets on the right in each figure respectively label the content-distribution system 102, the fingerprint-matching server 106, and the content-presentation device 104, each bracket indicating which of the depicted operations are carried out by the entity identified by the respective bracket label.

FIG. 5A depicts a time snapshot of operations relating to the cold match procedure for a sub-segment 502 of program segment A during time interval 504 (indicated on the timeline 560). A conceptual "magnification" of at least a portion of the sub-segment 502 is shown as broadcast frames 501-b, represented by a regular time sequence of vertical tick marks, each tick mark signifying a frame. These represent frames as broadcast by the content-distribution system 102. The content-distribution system 102 also generates reference fingerprints 503 at the source frame rate, and sends them to the fingerprint-matching server 106. For purposes of illustration, fingerprints are represented as a regular time sequence of arbitrary "data points" (i.e., arbitrary values), each signifying some form of metric of the frame's data content. It should be understood that, in practice, fingerprint data may not correspond to a single (scalar) data value, and could be more complex.

The broadcast frames 501-b are received by the content-presentation device 104 as received frames 501-r, where they may be played out (i.e., presented). As shown, the content-presentation device 104 also down-samples the received frames 501-r, represented as down-sampled frames 505, and generates query fingerprints 507 at the down-sampled rate. By way of example, the down-sampling rate is taken to be every fourth frame, or ¼ the source frame rate. In an example embodiment, a down-sampling process may input frames to a fingerprint-generating process as the received frames are down-sampled, as opposed, for example, to generating a down-sample sequence of frames and inputting the sequence to a fingerprint-generating process. However, generating and inputting a down-sampled sequence of frames is also possible.

The content-presentation device 104 also transmits the down-sampled query fingerprints 507 to the fingerprint-matching server 106, as indicated. The fingerprint-matching server 106 then performs a cold match as a form of correlation of the down-sampled query fingerprints 507 with the source-sampled reference fingerprints 503 over a correlation window 508. A matching correlation is represented pictorially by slanted dashed lines indicating an alignment of particular source-sampled fingerprints with corresponding particular down-sampled query fingerprints. In the case of ideal system performance, a nearly perfect match may be achieved in principle if the reference and query fingerprints originate from the same sequence of frames. In practice, timing and/or sampling irregularities—or "jitter," as described below—may degrade what might otherwise be a nearly perfect correlation. However, a match or correlation may still be considered acceptable or "good enough" if a computed correlation achieves one or more thresholds, for example. A matching threshold or thresholds may thereby quantify matching criteria.

If the correlation achieves a suitable threshold, then the cold match may be considered to have been successful. As described above, a successful cold match confirms what broadcast frames are being received by the content-presentation device—at least at the time of the cold match—and allows the fingerprint-matching server to recognize and identify the upcoming replaceable segment in the broadcast stream, as indicated.

FIG. 5B depicts a time snapshot of operations relating to the hot match procedure for a sub-segment 522 of program segment A during time interval 524 (indicated on the timeline 560). Note that the time interval 524 occurs later than the time interval 504. In particular, it occurs closer to the end of program segment A and the start of the replaceable segment, where the hot match may be applied for reasons described above. A conceptual magnification of at least a portion of the sub-segment 522 is shown as broadcast frames 521-b, represented, again, by a regular time sequence of vertical tick marks. These also represent frames as broadcast by the content-distribution system 102. The content-distribution system 102 again generates reference fingerprints 523 at the source frame rate (once more shown as a regular time sequence of arbitrary data points), and sends them to the fingerprint-matching server 106.

The broadcast frames 521-b are received by the content-presentation device 104, designated received frames 521-r in FIG. 5B. Also, as described above, the fingerprint-matching server 106, having determined that a replacement opportunity is upcoming, may transmit the source-sampled fingerprint data 523 to the content-presentation device 104, as indicated. The content-presentation device 104 may, in turn, take this as signal to begin the hot match procedure, which entails generating query fingerprints from the received frames 521-r at a higher sampling rate than in the cold match procedure. Thus, the content-presentation device 104 may down-sample the received frames 521-r, represented as down-sampled frames 525, and generate query fingerprints 527 at the higher down-sampled rate. By way of example, the higher down-sampling rate is taken to be every other frame, or ½ the source frame rate. However, other down-sampling rates could be used.

The content-presentation device 104 now carries out a hot match, again as a form of correlation of the down-sampled query fingerprints 527 with the source-sampled reference fingerprints 523, in this case over a correlation window 528. A matching correlation is again represented pictorially by slanted dashed lines indicating an alignment of particular source-sampled fingerprints with corresponding particular down-sampled query fingerprints. Note the higher density of correlation points, which corresponds to the higher down-sampling rate of the received frames 521-r and the resulting higher rate of query fingerprints 527.

If the correlation achieves a suitable threshold, then the hot match may be considered to have been successful. As described above, a successful hot match reconfirms that the content-presentation device 104 is still receiving program segment A, and also facilitates precise timing for the content-presentation device to being replacement playout of the replaceable segment with replacement content 532, as indicated. The replacement content 532 may be identified and obtained by the content-presentation device 104 according to operations described above (e.g., in time-periods T35-T40).

In both the cold match procedure and the hot match procedure, the correlation between the query and reference fingerprints may entail comparing individual query fingerprints in a query sequence to individual reference fingerprint in a reference sequence, performed by sliding the query sequence across the reference sequence. As such, the matching operation may be considered as sliding window correlation. For the case of video frames, each query fingerprint may be or correspond to a global intensity of a respective query video frame, and a set of local intensities and corresponding spatial frame coordinates of the respective query video frame. Reference fingerprint may be similarly computed from reference video frames. The matching operation may then involve computing a hamming distance between pairs of query and reference fingerprints.

Once again, in the case of ideal system performance, a nearly perfect hot match may be achieved in principle. However, at the higher down-sampling rate used in the hot match procedure, departures from ideal performance may be more likely, and may more severely degrade what might otherwise be a nearly perfect correlation, thereby negatively impacting the ability achieve a hot match when the data would otherwise yield one. In particular, the processing demands placed on the content-presentation device 104 during the hot match procedure may make it more susceptible to some type performance degradation that could actually cause or introduce irregularities, such as jitter, described in more detail below.

Thus, it can happen that in sampling the incoming video broadcast stream at the higher sampling rate, the sampling operation may introduce timing and/or sampling irregularities, generally referred to as jitter, into the sub-sampled sequence of video frames. This may be the result of, and/or exacerbated by, an increase in processing demands on the content-presentation device resulting from the higher sampling rate, higher fingerprint-generation rate, and the need to execute the hot match procedure. Jitter may then be propagated into the sequence of query fingerprint generated from the sub-sampled sequence. As noted above, a possible result of jitter in the sequence of query fingerprints may be degradation of the cold match and/or hot match operation. As also noted, the hot match operation may be based on a higher frame rate, and so may be more susceptible to jitter-based degradation. A result of degradation of the hot match operation may be that the sub-sequence of query fingerprints fails to match the reference fingerprint, even when the channel on which the incoming video is arriving is still the channel identified by the cold match. That is, even though the conditions for proceeding with an upcoming replacement operation or continuing with an ongoing replacement operation may be valid, the hot match may fail due to jitter introduced into the query fingerprint sequence. As a result, the smart TV may erroneously abort the upcoming replacement operation, and the associated replacement opportunity may be erroneously lost or forfeited. For the case in which an erroneous (false) hot match failure occurs during an ongoing replacement operation, the result may appear as discontinuous programming presentation, as, for example, presentation of a replacement advertising segment is suddenly replaced with original content.

In general, jitter introduced by down-sampling may take two basic forms. One relates to processing or other delays that result in delivery to a fingerprint-generating operation of a sequence of otherwise correctly down-sample video frames with irregular timing between the down-sampled frames. This type of jitter is referred to herein as "pipeline jitter." For example, a regularly-spaced sequence of video frames at a source rate of 30 frames per second may be down-sampled to 7.5 frames per second by selecting every fourth frame. In pipeline jitter, the selection of every fourth video frame may be correct, but due to processing delays or other performance issues, the temporal spacing between the selected frames may be irregular. The timing irregularities may then be propagated to the sequence of query fingerprints generated from the down-sampled frame sequence. The resulting sequence of query fingerprints, with irregular time spacing, may erroneously fail to (hot) match the reference fingerprints from the fingerprint-matching server.

The other basic form of jitter relates to incorrect selection—i.e., incorrect down-sampling—of video frames from the source stream. This type of jitter is referred to herein as "down-sampling jitter," and may similarly be the result of computational performance issues. Again taking the example of down-sampling from 30 to 7.5 frames per second, down-sampling jitter might result in selection of a mix correct and (possibly random) incorrect frames, such as of every seventh, eighth, ninth, and/or tenth frame. The down-sampling selection irregularities may then be propagated to the sequence of query fingerprints generated from the down-sampled frame sequence. Again, the resulting sequence of query fingerprints may erroneously fail to (hot) match the reference fingerprints from the fingerprint-matching server.

Figure 6A:
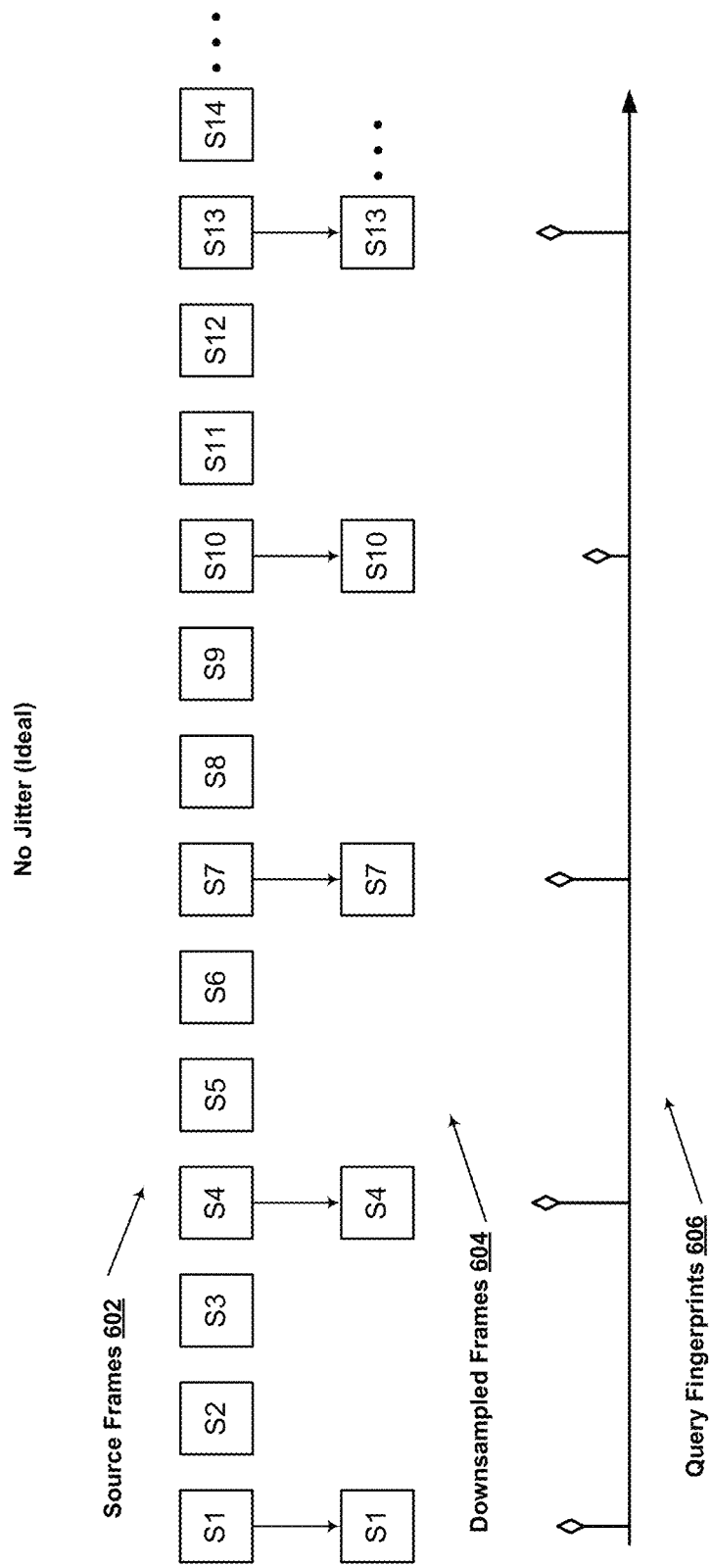
FIGS. 6A, 6B, and 6C collectively illustrate examples of different forms of jitter.
Figure 6B:
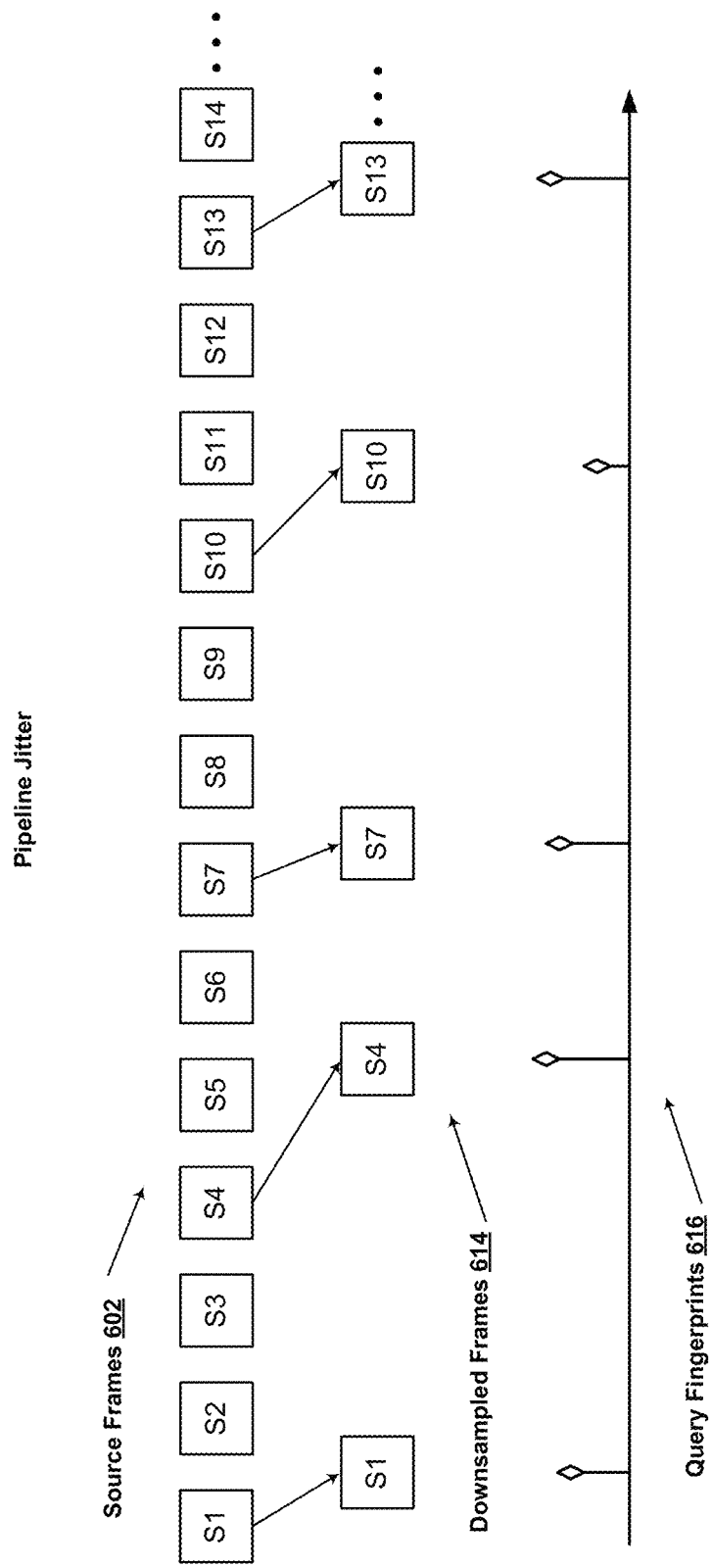
Figure 6C:
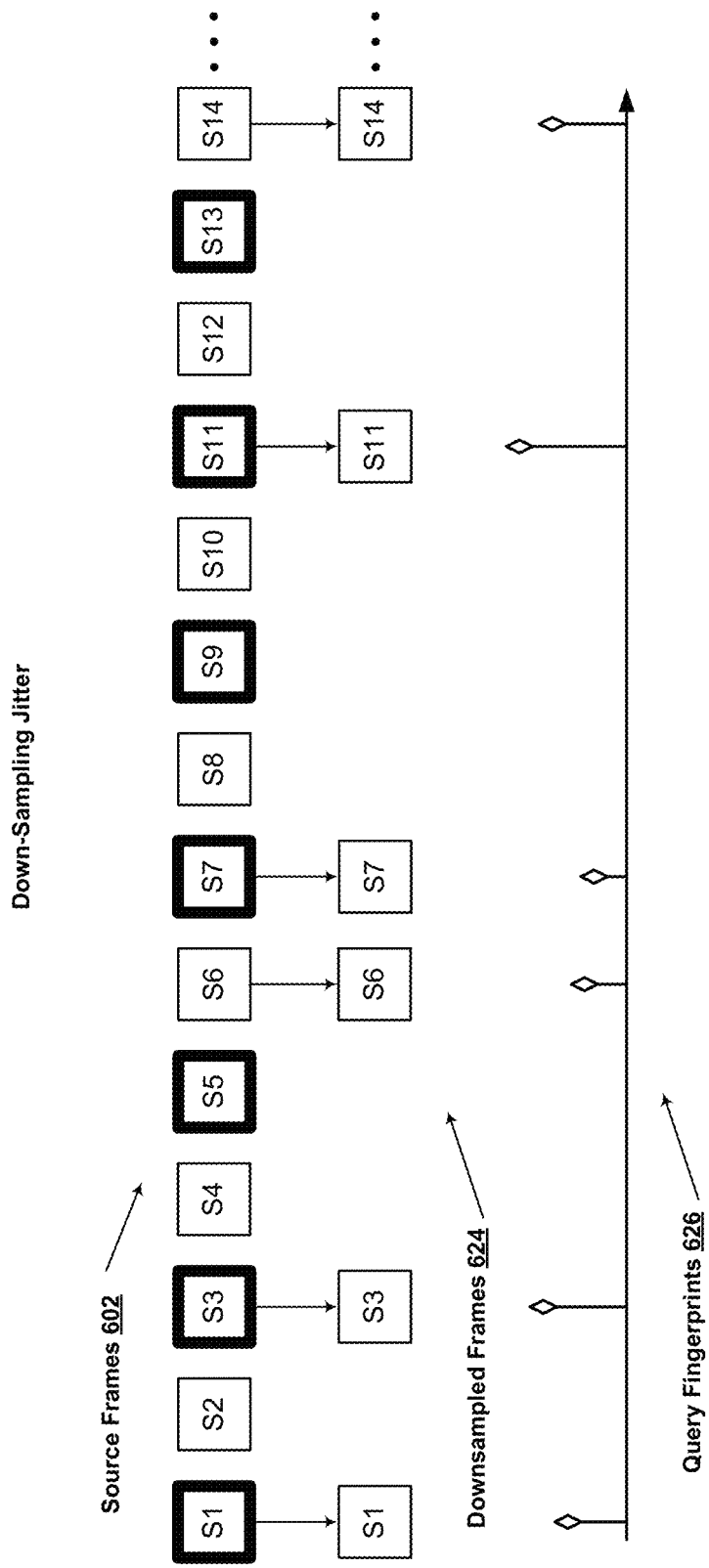

FIGS. 6A, 6B, and 6C respectively illustrate examples of down-sampling without jitter, down-sampling with pipeline jitter, and down-sampling with down-sampling jitter. The figures also illustrate the effect of jitter (or absence thereof) on query fingerprints generated from the down-sampled frames. In each figure, a sequence of source frames 602 is represented by regularly-spaced squares labeled S1, S2, . . . , S14, . . . . A sequence of down-sampled frames is shown below the sequence of source frames in each figure, with the down-sampling process represented by a downward arrow from selected frames of the source frames 602 to a corresponding frame in the down-sampled sequence. A sequence of query fingerprints corresponding to the down-sampled frames is displayed below the down-sampled frames in each figure.

FIG. 6A first conceptually illustrates the down-sampling process and resulting query fingerprints for the (ideal) case of no jitter. By way of example, the source frames 602 are down-sampled every fourth frame to produce the down-sampled frame sequence 604. Without jitter, the correct frames from the source frames 602 are selected, and the down-sampled frames are regularly-spaced in time at ¼ the source frame rate, as shown. Thus, the selected frames S1, S4, S7, S10, S13, . . . are selected and maintain their original temporal spacing in the down-sampled frame sequence 614. In the absence of any time irregularities in the fingerprint-generating process, a corresponding sequence of query fingerprints 606 may be produced with the down-sampled temporal spacing between each fingerprint, as indicated.

FIG. 6B next conceptually illustrates the down-sampling process and resulting query fingerprints for the case of pipeline jitter. Again by way of example, the source frames 602 are down-sampled every fourth frame to produce the down-sampled frame sequence 614. As shown, the correct source frames are selected—namely, frames S1, S4, S7, S10, S13, . . . . However, due to one or another form of processing delay or performance degradation of the content-presentation device, for example in or during the down-sampling process, the temporal spacing between the correctly-selected source frames evidently deviates from the regular ¼ source rate spacing in the source frame sequence 602. The irregular spacing in the down-sampled sequence 614 may then propagated to the query fingerprints 616, as shown. The result may thus be irregularly-spaced fingerprints, which can then impair the ability to match the query and reference fingerprints. Note that pipeline jitter can additionally or alternatively be introduced in the fingerprint-generating process, such that pipeline jitter in the input down-sampled frames may be exacerbated, or may be introduced into an otherwise jitter-free input sequence of down-sampled frames.

FIG. 6C next conceptually illustrates the down-sampling process and resulting query fingerprints for the case of down-sampling jitter. In this example, the source frames 602 are down-sampled every other frame to produce the down-sampled frame sequence 624. As a visual cue, intended frames in the source frame sequence 602—namely, frames S1, S3, S5, S7, S9, S11, S13, . . . —are depicted with thick black lines. However, due to one or another form of processing delay or performance degradation of the content-presentation device, for example in or during the down-sampling process, some of the source frames are incorrectly selected. By way of example, the down-sampled frame sequence includes frames S1, S3, S6, S7, S9, S11, S14, . . . . The incorrectly down-sampled sequence 624 may then be propagated to the query fingerprints 626, as shown. The result may thus be fingerprints for at least some incorrect frames, which may once more impair the ability to match the query and reference fingerprints.

It is also possible for performance and/or other computational issues to result in a mix of pipeline and down-sampling jitter. Jitter may also describe general delays in delivery of down-sample frames to the fingerprint generation operation. A separate and/or additional source of jitter may also derive from a non-integer relation between the source frame rate and the down-sampling rate, resulting a systematic temporal drift between the two rates. Over time, drift accumulation could then result in down-sampling jitter even in the absence of other possible processing delays or performance degradation.

The reason that jitter can degrade the hot match operation can be understood by considering a simplified description of the hot match operation as a form of signal correlator, as suggested above by depiction of the correlation windows in FIGS. 5A and 5B. More particularly, a time series of query fingerprints can be taken to represent a signal that is matched against a set of time series reference fingerprints by performing a sliding window correlation of the query series across the reference series. A correlation that produces the highest value and meets various thresholding rules may be considered a match. In practice, the process may be more complex because a fingerprint may typically not be a single measured value, such as intensity, but structured data representing global and local features in form where comparisons can be performed using hamming distance techniques. In addition, the time series of the query can represent different time intervals from the reference time series. For example, the reference fingerprints may be captured at 16 frames per second, while down-sampling of the source video frames may yield query fingerprints 16, 8, or 2 frames per second. But as long as the query fingerprints are regularly spaced and/or correctly selected, the correlation may be adapted to achieve a match when one exists. Pipeline jitter and/or down-sampling jitter can cause misalignment between like fingerprints in the query and reference time series, degrading the ability to find a correlation that in the sliding window process. Similarly, general delay in delivery of the down-sampled frames may result in query fingerprints that fall outside the boundaries of the sliding window correlator.

Example embodiments herein are further directed to techniques for mitigation and/or compensating the effects of jitter on the hot match procedure and the results it produces. More specifically, methods and systems described herein may determine that a content-modification opportunity is upcoming, and responsively cause or invoke actions to mitigate and/or compensate jitter that may arise when the content-presentation device switches from a lower to a higher frame sampling rate.

In accordance with example embodiments, a content-presentation device may use timestamps associated with down-sampled frames in order to adjust timing irregularities in the query fingerprints when sampling of content frames is subject to frame jitter. More particularly, upon determining that a content-modification opportunity is upcoming, the content-presentation device may switch from down-sampling to two frames per second to a higher rate, such as eight or even 16 frames per second. As described above, jitter in down-sampled frames may be propagated to the query fingerprints generated from those down-sampled frames. Jitter in the query fingerprints can show up as irregularities in an expected inter-fingerprint offsets in the query fingerprints. Timestamps respectively associated with a sequence of query fingerprints may be used to detect the irregularities and to realign the sequence in a manner that conforms with the correlation operation used in the matching procedure.

In an example embodiment, the content-presentation device may obtain timestamps associated with each incoming content frame. The timestamps may be generated by the content-presentation device, or may be part of metadata associated with the received content frames. Obtaining the timestamps may be done on a routine basis for all received content, even when there is no indication of an upcoming content-modification opportunity, or may be an operation that commences in response to a determination of an upcoming content-modification opportunity. The down-sampling operation may then include associating each down-sampled frame with its timestamp. Similarly, the fingerprint-generating operation may associate each respective query fingerprint with the associated timestamp of the frame from which the respective query fingerprint was derived. In this way, the occurrence of jitter in the query fingerprints can be detected by consulting their associated timestamps, and the timestamps may be used to compensate for timing irregularities in the sequence.

A simple example may illustrate how the timestamps may be used to compensate for jitter and to mitigate the effect that jitter would otherwise have on the correlation between query and reference fingerprints. Taking an example source rate of incoming reference fingerprints to be 16 reference fingerprints per second, and an example down-sampled rate of content frames to be eight frames per second, a simplified, example correlation process would search for a match of a time series of query fingerprints spaced out every other time-index with respect to the time indices of the time series of reference fingerprints. Jitter in the time series of query fingerprints could corrupt the expected relationship between indices of the reference time series and indices of the query time series. Using timestamps to compensate for pipeline jitter could restore the expected relationship. Using timestamps to compensate for down-sampling jitter (where the wrong frames are selected) could establish a new known relationship. In either case, or a mixed case, sliding the adjusted, jitter-compensated query time series across the reference time series could again yield uncorrupted correlation results. In particular, an erroneous hot match failure could be avoided. It should be understood that this simplified, illustrative example is not intended to be limiting with respect to example embodiments described herein.

Figure 7:
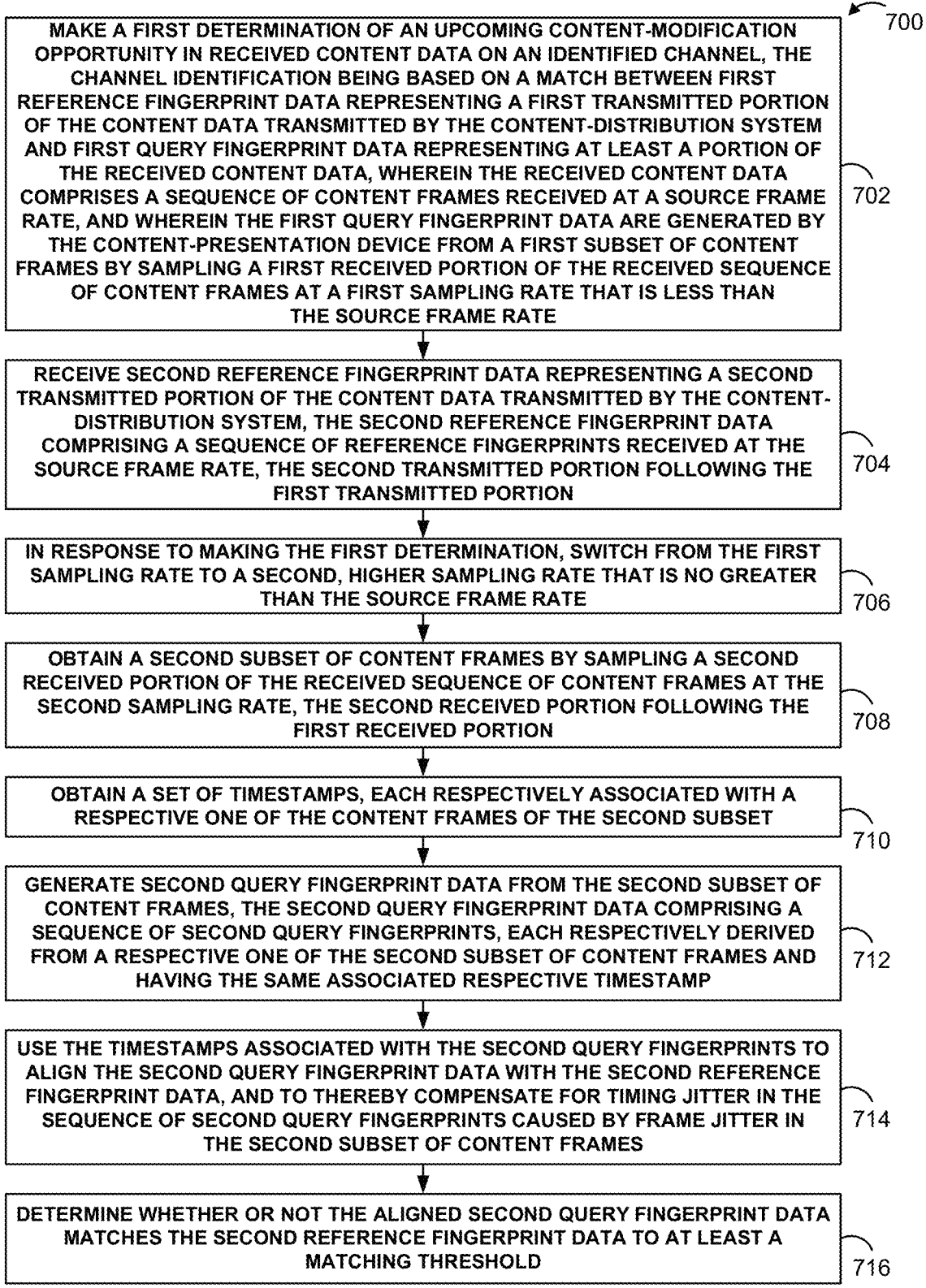
FIG. 7 is a flow chart of an example method.

FIG. 7 is a flow chart of an example method 700 that may be implemented on a content-presentation device in order to mitigate and/or compensate jitter during down-sampling of received frame-based content. The example method 700 may be implemented as computer-readable instructions store in one or another form of memory (such as volatile or non-volatiles memory) of a computing device or system of the content-presentation device. An example of a computing system is shown in FIG. 2. When executed by one or more processors of the computing device or system of the content-presentation device, the instructions may cause the content-presentation device to carry out operations of the example method 700. The computer-readable instructions may additionally be stored on a non-transitory computer readable medium, which may be used, for example, for loading the instructions into the memory of the computing system. In some examples, the non-transitory computer-readable medium could be the memory of the computing system.

At block 702, the example method 700 includes making a first determination of an upcoming content-modification opportunity in content data received by the content-presentation device on an identified channel from the content-distribution system. The channel identification may be based on a match between first reference fingerprint data representing a first transmitted portion of the content data transmitted by the content-distribution system and first query fingerprint data representing at least a portion of the received content data. The received content data may be or include a sequence of content frames received at a source frame rate, and the first query fingerprint data may be generated by the content-presentation device from a first subset of content frames by sampling a first received portion of the received sequence of content frames at a first sampling rate. The first sampling rate may be less than the source frame rate. As described, the channel identification may be related to the cold match procedure.

At block 704, the example method 700 includes receiving second reference fingerprint data representing a second transmitted portion of the content data transmitted by the content-distribution system. The second reference fingerprint data may be or include a sequence of reference fingerprints received at the source frame rate, wherein the second transmitted portion follows the first transmitted portion.

At block 706, the example method 700 includes switching from the first sampling rate to a second, higher sampling rate, where the second sampling rate is no greater than the source frame rate in response to making the first determination.

At block 708, the example method 700 includes obtaining a second subset of content frames by sampling a second received portion of the received sequence of content frames at the second sampling rate. In this case, the second received portion follows the first received portion.

At block 710, the example method 700 includes obtaining a set of timestamps, each being respectively associated with a respective one of the content frames of the second subset.

At block 712, the example method 700 includes generating second query fingerprint data from the second subset of content frames, where the second query fingerprint data is or includes a sequence of second query fingerprints, each respectively derived from a respective one of the second subset of content frames and having the same associated respective timestamp.

At block 714, the example method 700 includes using the timestamps associated with the second query fingerprints to align the second query fingerprint data with the second reference fingerprint data, and to thereby compensate for timing jitter in the sequence of second query fingerprints caused by frame jitter in the second subset of content frames.

Finally, at block 716, the example method 700 includes determining whether or not the aligned second query fingerprint data matches the second reference fingerprint data to at least a matching threshold.

In accordance with example embodiments, the second subset of content frames may include frames selected from the second received portion of the received sequence of content frames. With this configuration, sampling the second received portion of the received sequence of content frames at the second sampling rate may entail selecting frames by down-sampling the second received portion. Down-sampling may involve skipping a set number of frames in between each selected frame of the second received portion. Additionally or alternatively down-sampling may involve selecting each respective frame of the second received portion that is within a time-tolerance of an expected frame periodicity corresponding to the second sampling rate. More specifically, the expected frame periodicity of the second subset may correspond to the inverse of the second sampling rate.

In accordance with example embodiments, the method 700 may further involve generating an adjusted sequence of second query frames by temporally spacing content frames of the second subset according to their respective associated timestamps. That is, the adjusted sequence of second query frames may correspond to the second subset of content frame, corrected or adjusted for jitter.

In accordance with example embodiments, obtaining the set of timestamps may entail making a timing determination for each content frame of the second subset. In particular, the timing determination may be made by extracting a respective timestamp from respective metadata associated with each content frame of the second subset, and/or by computing the respective timestamp for each content frame of the second subset based on a clock of the content-presentation device. For example, a local clock of the content-presentation device may be used to derive an arrival timestamp for each content frame of the second received portion.

In accordance with example embodiments, obtaining the set of timestamps may involve determining a respective timestamp for each content frame of the second subset in response to switching from the first sampling rate to the second, higher sampling rate. That is, the content-presentation device may not obtain or generate timestamps on a routine basis for all arriving content frames, but may only commence doing so in response to switching from the first sampling rate to the second, higher sampling rate.

In accordance with example embodiments, using the timestamps associated with the second query fingerprints to align the second query fingerprint data with the second reference fingerprint data may involve generating an adjusted sequence of second query fingerprints by temporally spacing the second query fingerprints according to their respective associated timestamps. A sliding-window correlation of the adjusted sequence of second query fingerprints with the second reference fingerprint data may next be computed. Then, a determination may be made of whether or not a maximum of computed correlations over the sliding window equals or exceeds the matching threshold.

In accordance with example embodiments, the method may further involve using the set of timestamps to distinguish between pipeline jitter and down-sampling jitter in the second subset of content frames. For example, timestamps may enable fingerprints to be temporally spaced according to the arrival-time spacing of their corresponding source frames. In the absence of down-sampling jitter, the time-adjusted fingerprints may then appear regularly spaced. If the time-adjusted fingerprints retain irregular temporal spacing, it may be concluded that at least some down-sampling jitter is present.

In accordance with example embodiments, the content data may be or include video data, in which case, the content frames be or include video frames.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method carried out by a content-presentation device of a content-modification system that includes a content-distribution system, the method comprising:

making a first determination of an upcoming content-modification opportunity in content data received by the content-presentation device on an identified channel from the content-distribution system, wherein identification of the channel is based on a match between first reference fingerprint data representing a first transmitted portion of the content data transmitted by the content-distribution system and first query fingerprint data representing at least a portion of the received content data, wherein the received content data comprises a sequence of content frames received at a source frame rate, and wherein the first query fingerprint data are generated by the content-presentation device from a first subset of content frames by sampling a first received portion of the received sequence of content frames at a first sampling rate that is less than the source frame rate;

receiving second reference fingerprint data representing a second transmitted portion of the content data transmitted by the content-distribution system, the second reference fingerprint data comprising a sequence of reference fingerprints received at the source frame rate, wherein the second transmitted portion follows the first transmitted portion;

in response to making the first determination, switching from the first sampling rate to a second, higher sampling rate, wherein the second sampling rate is no greater than the source frame rate;

obtaining a second subset of content frames by sampling a second received portion of the received sequence of content frames at the second sampling rate, wherein the second received portion follows the first received portion;

obtaining a set of timestamps, each being respectively associated with a respective one of the content frames of the second subset;

generating second query fingerprint data from the second subset of content frames, the second query fingerprint data comprising a sequence of second query fingerprints, each respectively derived from a respective one of the second subset of content frames and having the same associated respective timestamp;

using the timestamps associated with the second query fingerprints to align the second query fingerprint data with the second reference fingerprint data, and to thereby compensate for timing jitter in the sequence of second query fingerprints caused by frame jitter in the second subset of content frames; and determining whether or not the aligned second query fingerprint data matches the second reference fingerprint data to at least a matching threshold.

2. The method of claim 1, wherein the second subset of content frames comprises frames selected from the second received portion of the received sequence of content frames, and wherein sampling the second received portion of the received sequence of content frames at the second sampling rate comprises down-sampling the second received portion by one of: (i) skipping a set number of frames in between each selected frame of the second received portion, or (ii) selecting each respective frame of the second received portion that is within a time-tolerance of an expected frame periodicity corresponding to the second sampling rate.

3. The method of claim 1, further comprising generating an adjusted sequence of second query frames by temporally spacing content frames of the second subset according to their respective associated timestamps.

4. The method of claim 1, wherein obtaining the set of timestamps comprises making a timing determination for each content frame of the second subset by one of (i) extracting a respective timestamp from respective metadata associated with each content frame of the second subset, or (ii) computing the respective timestamp for each content frame of the second subset based on a clock of the content-presentation device.

5. The method of claim 1, wherein obtaining the set of timestamps comprises determining a respective timestamp for each content frame of the second subset in response to switching from the first sampling rate to the second, higher sampling rate.

6. The method of claim 1, wherein using the timestamps associated with the second query fingerprints to align the second query fingerprint data with the second reference fingerprint data comprises:

generating an adjusted sequence of second query fingerprints by temporally spacing the second query fingerprints according to their respective associated timestamps;

computing a sliding-window correlation of the adjusted sequence of second query fingerprints with the second reference fingerprint data; and determining whether or not a maximum of computed correlations over the sliding window equals or exceeds the matching threshold.

7. The method of claim 1, further comprising using the set of timestamps to distinguish between pipeline jitter and down-sampling jitter in the second subset of content frames.

8. The method of claim 1, wherein the content data comprises video data, and wherein the content frames comprise video frames.

9. A content-presentation device of a content-modification system that includes a content-distribution system, the content-presentation device comprising:

one or more processors; and a non-transitory computer-readable storage medium, having stored thereon program instructions that, upon execution by the one or more processors, cause the content-presentation device to carry out operations including:

making a first determination of an upcoming content-modification opportunity in content data received by the content-presentation device on an identified channel from the content-distribution system, wherein identification of the channel is based on a match between first reference fingerprint data representing a first transmitted portion of the content data transmitted by the content-distribution system and first query fingerprint data representing at least a portion of the received content data, wherein the received content data comprises a sequence of content frames received at a source frame rate, and wherein the first query fingerprint data are generated by the content-presentation device from a first subset of content frames by sampling a first received portion of the received sequence of content frames at a first sampling rate that is less than the source frame rate;

receiving second reference fingerprint data representing a second transmitted portion of the content data transmitted by the content-distribution system, the second reference fingerprint data comprising a sequence of reference fingerprints received at the source frame rate, wherein the second transmitted portion follows the first transmitted portion;

in response to making the first determination, switching from the first sampling rate to a second, higher sampling rate, wherein the second sampling rate is no greater than the source frame rate;

obtaining a second subset of content frames by sampling a second received portion of the received sequence of content frames at the second sampling rate, wherein the second received portion follows the first received portion;

obtaining a set of timestamps, each being respectively associated with a respective one of the content frames of the second subset;

generating second query fingerprint data from the second subset of content frames, the second query fingerprint data comprising a sequence of second query fingerprints, each respectively derived from a respective one of the second subset of content frames and having the same associated respective timestamp;

using the timestamps associated with the second query fingerprints to align the second query fingerprint data with the second reference fingerprint data, and to thereby compensate for timing jitter in the sequence second query fingerprints caused by frame jitter in the second subset of content frames; and determining whether or not the aligned second query fingerprint data matches the second reference fingerprint data to at least a matching threshold.

10. The content-presentation device of claim 9, wherein the second subset of content frames comprises frames selected from the second received portion of the received sequence of content frames, and wherein sampling the second received portion of the received sequence of content frames at the second sampling rate comprises down-sampling the second received portion by one of: (i) skipping a set number of frames in between each selected frame of the second received portion, or (ii) selecting each respective frame of the second received portion that is within a time-tolerance of an expected frame periodicity corresponding to the second sampling rate.

11. The content-presentation device of claim 9, wherein the operations further include generating an adjusted sequence of second query frames by temporally spacing content frames of the second subset according to their respective associated timestamps.

12. The content-presentation device of claim 9, wherein obtaining the set of timestamps comprises making a timing determination for each content frame of the second subset by one of (i) extracting a respective timestamp from respective metadata associated with each content frame of the second subset, or (ii) computing the respective timestamp for each content frame of the second subset based on a clock of the content-presentation device.

13. The content-presentation device of claim 9, wherein obtaining the set of timestamps comprises determining a respective timestamp for each content frame of the second subset in response to switching from the first sampling rate to the second, higher sampling rate.

14. The content-presentation device of claim 9, wherein using the timestamps associated with the second query fingerprints to align the second query fingerprint data with the second reference fingerprint data comprises:
generating an adjusted sequence of second query fingerprints by temporally spacing the second query fingerprints according to their respective associated timestamps;
computing a sliding-window correlation of the adjusted sequence of second query fingerprints with the second reference fingerprint data; and
determining whether or not a maximum of computed correlations over the sliding window equals or exceeds the matching threshold.

15. The content-presentation device of claim 9, wherein the operations further include using the set of timestamps to distinguish between pipeline jitter and down-sampling jitter in the second subset of content frames.

16. The content-presentation device of claim 9, wherein the content data comprises video data, and wherein the content frames comprise video frames.

17. A non-transitory computer-readable storage medium, having stored thereon program instructions that, upon execution by one or more processors of a content-presentation device of a content-modification system that includes a content-distribution system, cause the content-presentation device to carry out operations including:
making a first determination of an upcoming content-modification opportunity in content data received by the content-presentation device on an identified channel from the content-distribution system, wherein identification of the channel is based on a match between first reference fingerprint data representing a first transmitted portion of the content data transmitted by the content-distribution system and first query fingerprint data representing at least a portion of the received content data, wherein the received content data comprises a sequence of content frames received at a source frame rate, and wherein the first query fingerprint data are generated by the content-presentation device from a first subset of content frames by sampling a first received portion of the received sequence of content frames at a first sampling rate that is less than the source frame rate;
receiving second reference fingerprint data representing a second transmitted portion of the content data transmitted by the content-distribution system, the second reference fingerprint data comprising a sequence of reference fingerprints received at the source frame rate, wherein the second transmitted portion follows the first transmitted portion;
in response to making the first determination, switching from the first sampling rate to a second, higher sampling rate, wherein the second sampling rate is no greater than the source frame rate;
obtaining a second subset of content frames by sampling a second received portion of the received sequence of content frames at the second sampling rate, wherein the second received portion follows the first received portion;
obtaining a set of timestamps, each being respectively associated with a respective one of the content frames of the second subset;
generating second query fingerprint data from the second subset of content frames, the second query fingerprint data comprising a sequence of second query fingerprints, each respectively derived from a respective one of the second subset of content frames and having the same associated respective timestamp;
using the timestamps associated with the second query fingerprints to align the second query fingerprint data with the second reference fingerprint data, and to thereby compensate for timing jitter in the sequence second query fingerprints caused by frame jitter in the second subset of content frames; and
determining whether or not the aligned second query fingerprint data matches the second reference fingerprint data to at least a matching threshold.

18. The non-transitory computer-readable storage medium of claim 17, wherein obtaining the set of timestamps comprises making a timing determination for each content frame of the second subset by one of (i) extracting a respective timestamp from respective metadata associated with each content frame of the second subset, or (ii) computing the respective timestamp for each content frame of the second subset based on a clock of the content-presentation device.

19. The non-transitory computer-readable storage medium of claim 17, wherein using the timestamps associated with the second query fingerprints to align the second query fingerprint data with the second reference fingerprint data comprises:
generating an adjusted sequence of second query fingerprints by temporally spacing the second query fingerprints according to their respective associated timestamps;
computing a sliding-window correlation of the adjusted sequence of second query fingerprints with the second reference fingerprint data; and
determining whether or not a maximum of computed correlations over the sliding window equals or exceeds the matching threshold.

20. The non-transitory computer-readable storage medium of claim 17, wherein the content data comprises video data, and wherein the content frames comprise video frames.

* * * * *